United States Patent [19]
Evans et al.

[11] Patent Number: 5,187,469
[45] Date of Patent: Feb. 16, 1993

[54] UNIVERSAL REMOTE CONTROL INCLUDING QUICK TOUCH FUNCTION

[75] Inventors: Benjamin F. Evans; Jerry J. Heep, both of Weatherford; Peter H. Haagen, Arlington, all of Tex.

[73] Assignee: Tandy Corporation, Ft. Worth, Tex.

[21] Appl. No.: 799,913

[22] Filed: Nov. 26, 1991

Related U.S. Application Data

[63] Continuation of Ser. No. 563,224, Aug. 6, 1990, abandoned.

[51] Int. Cl.$^5$ .............................................. H04Q 1/00
[52] U.S. Cl. ..................... 340/825.220; 340/825.69; 340/825.72; 340/309.4; 358/194.1; 455/353
[58] Field of Search ....................... 340/825.22, 825.24, 340/825.69, 825.72, 825.56, 309.15, 309.4; 341/176, 23; 358/194.1, 183; 359/142, 146, 148; 455/151.1, 151.2, 151.4, 171.1, 231, 352, 353

[56] References Cited

U.S. PATENT DOCUMENTS

| | | |
|---|---|---|
| 4,279,012 | 7/1981 | Beckedorff et al. ............. 340/309.4 |
| 4,325,081 | 4/1982 | Abe et al. ........................... 340/309.4 |
| 4,426,736 | 1/1984 | Fisler .................................... 455/231 |
| 4,718,112 | 1/1988 | Shinod ................................. 455/151 |
| 4,821,102 | 4/1989 | Ichikawa et al. ..................... 358/183 |
| 4,825,200 | 4/1989 | Evans et al. .................... 340/825.72 |

Primary Examiner—Donald J. Yusko
Assistant Examiner—Edwin C. Holloway, III
Attorney, Agent, or Firm—Townsend & Townsend

[57] ABSTRACT

A method and apparatus for causing a remote controller to execute a sequence of instructions at a preprogrammed time. A remote controller includes a timer and may be used to turn on the various components of an electronic entertainment system including a recording device and to transmit a starting sequence which causes the recording device to record. After the selected duration of time expires the remote controller stops and recording device from recording and turns off the components of the system or causes other instructions to be performed.

21 Claims, 4 Drawing Sheets

UNIVERSAL REMOTE CONTROL INCLUDING QUICK TOUCH FUNCTION

NOTICE REGARDING COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office file or records, but otherwise reserves all copyright rights whatsoever.

This is a continuation of application Ser. No. 563,224, filed Aug. 6, 1990, now abandoned.

BACKGROUND OF THE INVENTION

The present invention relates to universal remote controls More particularly, the present invention is a method and apparatus for causing a remote controller to execute a sequence of instructions at a preprogrammed time.

A reconfigurable remote control transmitter is a transmitter used to control a plurality of remotely controlled products. Often, each of a plurality of products can be controlled from its own associated remote control transmitter. For example, there may be one remote control transmitter associated with a television receiver, another associated with a video cassette recorder and another associated with a turntable of a stereo system. The reconfigurable remote control transmitter is capable of learning the signals (typically infrared (I/R) signals) used by a plurality of such remote control devices so that a single remote control transmitter can be used to control a plurality of products.

A common problem which users of remotely controlled devices encounter when attempting to use their components during their absence is the need to turn on and off various components of their system. This is particularly true in the case of recording devices. For example, it may be desireable to record a television show when the user is not present. One technique for overcoming this problem is for the user to set the VCR's internal timer functions to record while he is away. The problem with using this feature of the VCR is that other components of the system may need to be turned on before recording begins. For example, if a cable box and television are connected to the system, each of these devices must be turned on in order to record from a particular station. Therefore, using the VCR's internal timer functions will not permit recording unless the other components of the system are left on for the entire time during the user's absence.

Another example of component adjustments which may need to be made during the user's absence is the need to adjust a satellite dish. If the satellite must be moved to a different position for maximum reception of a particular station, this function must be carried out before recording begins. This situation may arise where more than one recording session from more than one station is desired during the user's absence.

SUMMARY OF THE INVENTION

The present invention is a method and apparatus for remotely controlling a system to allow for operation of system components during the absence of the user. A universal remote control which can control the various components of the system includes a timer for keeping track of a selected duration of time. The remote control can store a sequence of instructions to be performed at a preprogrammed time at the depression of a single key. Upon depressing this key, the remote controller will turn on the various necessary system components at a desired time and turn them off after a selected duration of time. This universal remote control overcomes the problem of leaving system components on while the user is absent. Further, a satellite dish can be manipulated to a desired position and a program can be recorded without using the internal timing controls of the video cassette recorder. Other system components can also be controlled by this remote controller.

Another aspect of the invention is its ability to execute a sequence of instructions for the various components. For example, stereo components could be turned on immediately and be set to play for a period of one hour. Then, after a desired time has elapsed, a recording device may be turned on and put in the record mode to record a program. At the time of recording, other components may be turned on or placed in a particular position.

For a more complete understanding of the nature and advantages of the invention, reference should be made to the ensuing detailed description taken in conjunction with the accompanying drawings.

DETAILED DESCRIPTION OF THE DRAWINGS

To facilitate discussion of the present invention, an overview of a reconfigurable remote control transmitter will be provided before describing the scheduling system of the invention.

Figure 1A:
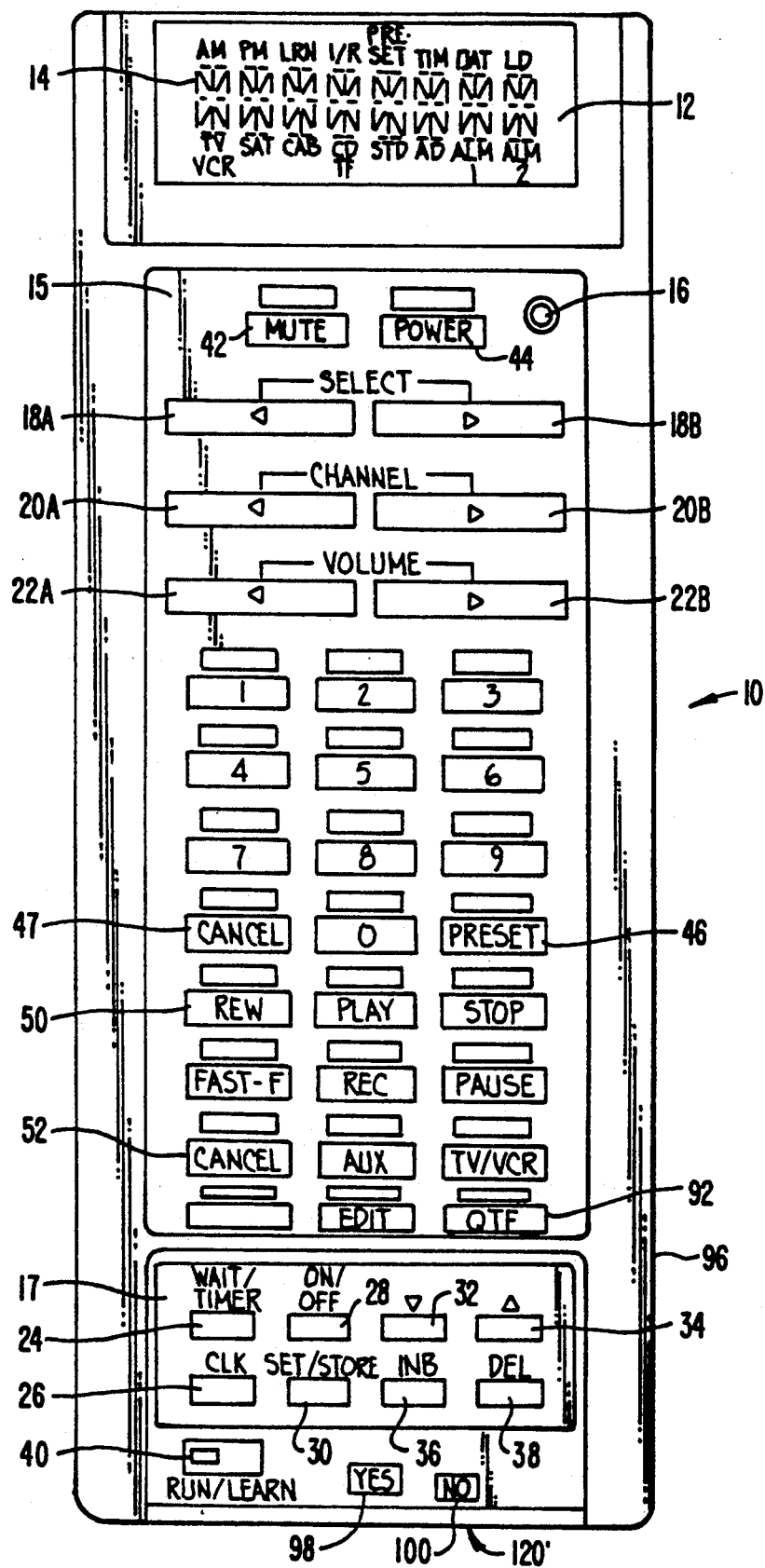
FIGS. 1A and 1B are alternate front plan views of a reconfigurable remote control transmitter.
Figures 1B, 1C:
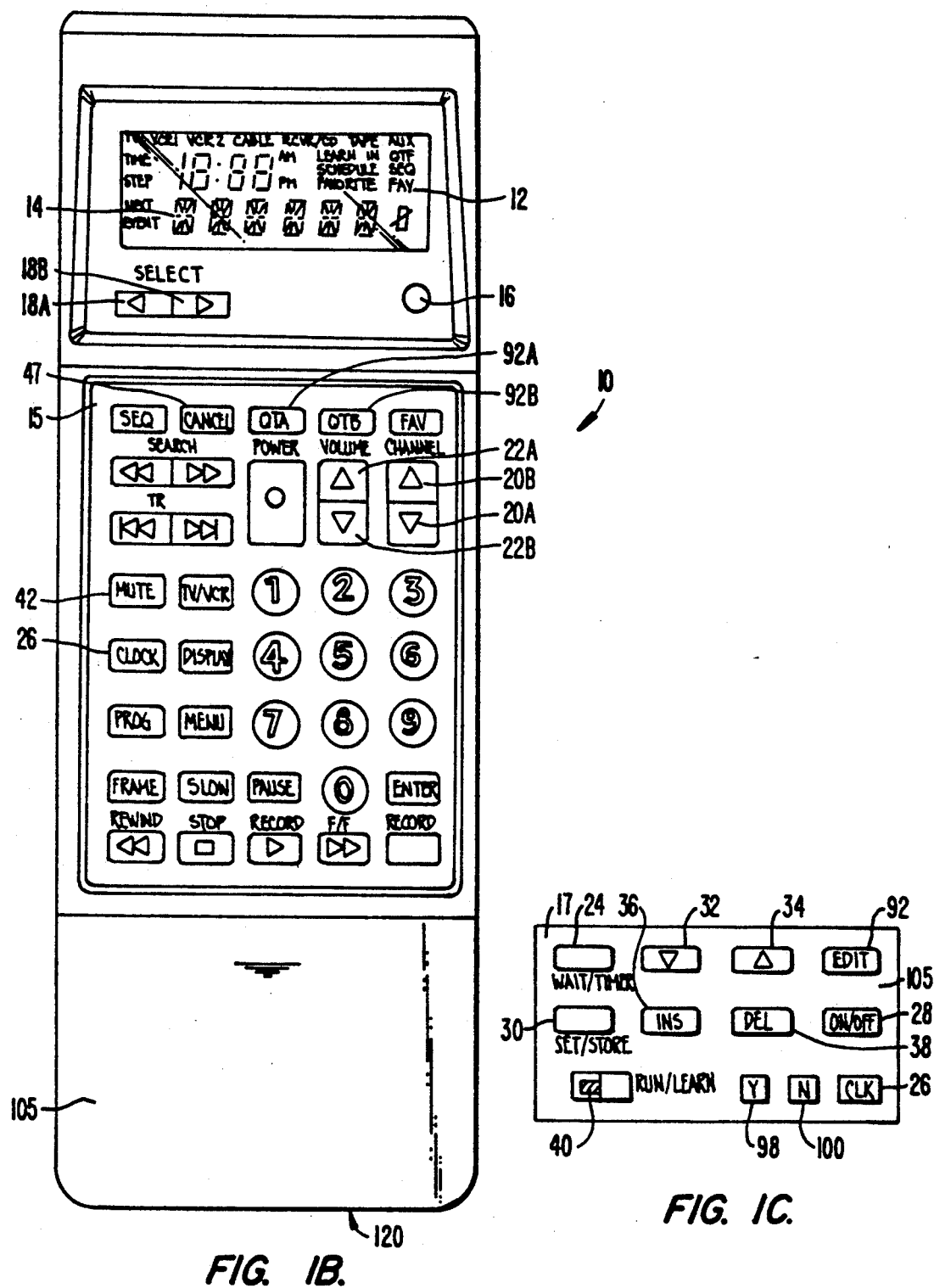
FIG. 1C is a view of the keys hidden behind the cover at the bottom of the reconfigurable remote control transmitter of FIG. 1B.

As seen in FIGS. 1A, 1B and 1C, the transmitter unit 10, for a preferred embodiment of the invention, has a display 12, which may, for example, be a liquid crystal display (LCD) and a plurality of input keys. Display 12 is divided into three areas. The primary area 14 displays eight alphanumeric characters in conventional matrix form.

Above alphanumeric characters 14 is printed a plurality of functions and below the alphanumeric display is printed a plurality of device indications. A separate, selectively illuminable light source such as an LCD is positioned under each function indication and under each device indication.

In addition to display 12, controller 10 also has an area 15 containing keys which are normally used to operate a device, which keys are normally accessible, and an area 17, shown in FIG. 1C with respect to the controller of FIG. 1B, containing special function keys used for programming controller 10, setting of the clock and timers, and programming keys to perform multiple functions, which area may be normally covered to prevent tampering by children and others. Area 17 is hidden by cover 105 during normal operation of remote controller 10 of FIG. 1B. Area 15 has a light 16 which may be a light emitting diode, lamp, or other suitable electrically controlled source of light which is enabled when the system is receiving key codes from a dedicated controller and is illuminated when the I/R transmitter of the source controller is suitably positioned with respect to the I/R receiver of controller 10 so as to permit proper receipt of the transmitted codes. Light 16 will not be on during the reception of codes if the two controllers are too far apart, or are not sufficiently aligned so as to permit accurate receipt of the transmitter I/R codes.

Controller 10 has a plurality of keys in areas 15 and 17, some of which may be programmed to perform a desired function and some of which are dedicated to a particular function. The dedicated keys include SELECT keys 18A and 18B, which may be used, as will be described later, to select various devices or functions, CHANNEL keys 20A and 20B which may be used to step either down or up respectively to select a desired channel, station, or the like for a particular device being controlled and VOLUME CONTROL keys 22A and 22B which may be used to lower or increase the sound volume of a controlled device. The remaining keys having dedicated functions are in area 17 and include a WAIT/TIMER key 24, a CLOCK CONTROL key 26, an ON/OFF key 28, a SET/STORE key 30, a DOWN CURSOR key 32, an UP CURSOR key 34, and INSERT key 36, and a DELETE key 38. Area 17 also includes run/learn switch 40, the setting of which determines whether the controller is operating normally or to receive codes from a dedicated controller.

Area 15 also has a plurality of programmable keys each of which may either perform the function printed on the key or may be programmed to perform another function which a user may indicate in the blank space appearing above the key. Above the SELECT keys 18 of FIG. 1A are two keys 42 and 44 which may function as a MUTE key and a POWER key respectively. However, if desired, these keys may also be programmed to perform other functions in a manner to be described hereinafter. Below VOLUME keys 22, there are ten keys which are nominally indicated as number pads to be used, for example, for channel selection. The remaining keys are shown labelled with common controlled functions such as "sequence," "rewind," "play," "stop," "fast forward," "record," "pause," "cancel," "auxiliary," and "TV/VCR." However, if a function is required for a particular device being controlled which is not reflected on the controller keyboard, any of these keys may be programmed to perform such function for such device and such function may be marked in the blank space above the key. Also included are edit keys for use in scheduling quick touch programming. The use of these keys is described below.

Figure 2:
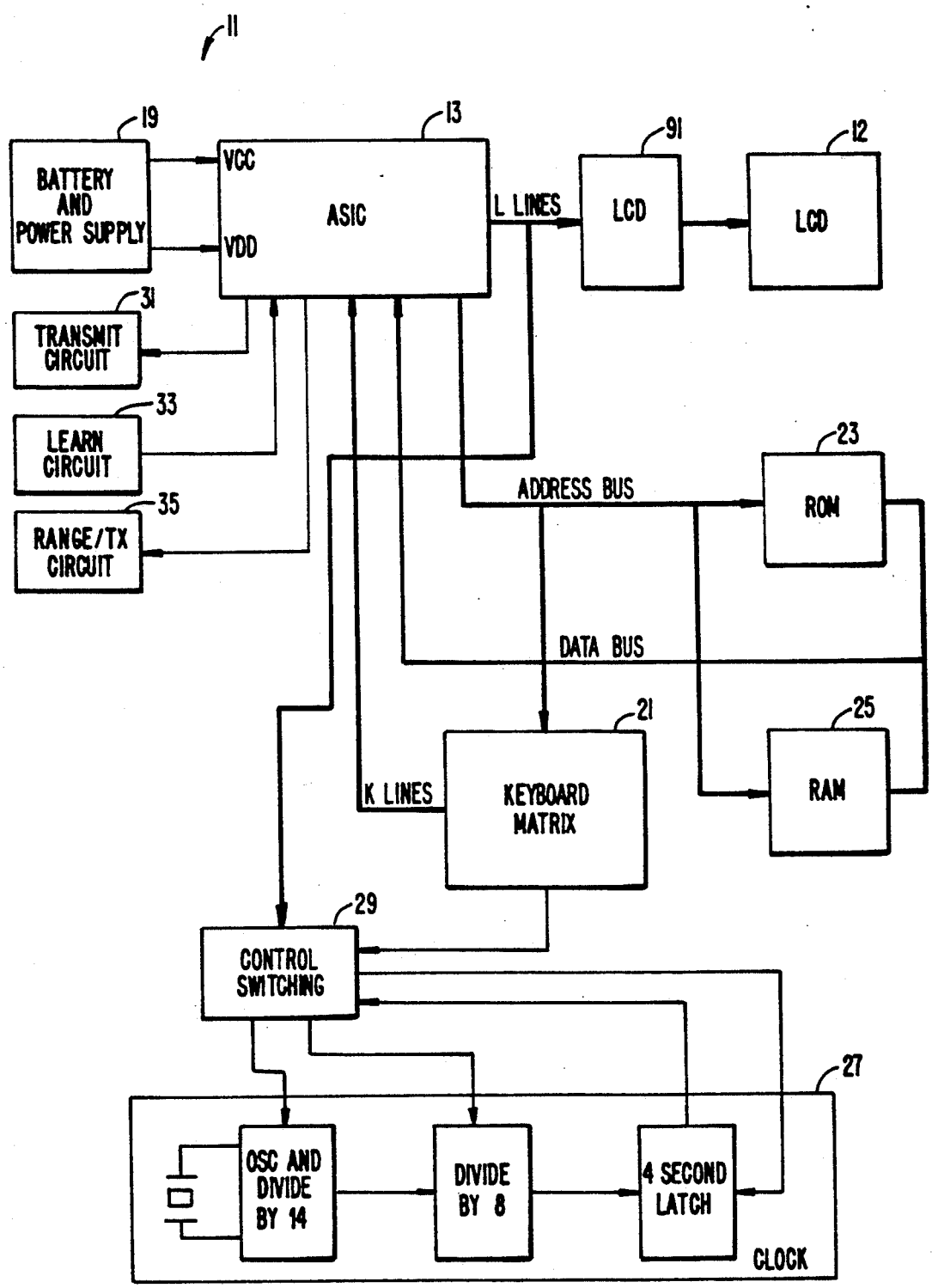
FIG. 2 is a block diagram of the components of a universal remote control.

FIG. 2 is a system level diagram of remote controller 10. Central processing unit (CPU) 13 is an application specific integrated circuit (ASIC) with a microprocessor core. CPU 13 is used to control the various components of remote controller 10. Display 12 is connected to CPU 13 through a display controller 91. Display 12 is used to display information to a user of remote controller 10. A battery and power supply 19 are used to power CPU 13 in remote controller 10.

A user may input instructions to remote controller 10 through a keyboard 21 including keys in areas 15 and 17. A ROM 23 is used to store code which is implemented in CPU 13 to carry out the different functions of remote controller 10. RAM 25 is used to store instruction codes learned by remote controller 10 as well as keystroke sequences input by a user on keyboard 21. The codes are compacted in order to minimize storage requirements. Compacted codes are transferred between RAM 25 and CPU 13 over the address bus and the data bus. RAM 25 also stores information relating to programmed code sequences to be performed by controller 10. The learning of various instructions and sequences of instructions from a dedicated controller is found in U.S. Pat. No. 4,825,200 to Evans, et al., incorporated herein by reference.

A clock 27 is a real time clock which can be used to display the time on display 12 as well as for use in keeping track of an amount of time which has elapsed during the recording of a selected duration and for use in commencing and ending a programming session. A control switching unit 29 interfaces keyboard 21 to clock 27 so that the time may be changed as well as interfacing clock 27 to CPU 13 so that elapsed time may be tracked.

A transmit circuit 31 is used to transmit infrared signals from CPU 13 to the remotely controllable devices in the system. Learn circuit 33 is used to input infrared signals from a dedicated remote controller so that remote controller 11 can learn the signals for controlling the various devices. Range transmit circuit 35 is used to determine whether the dedicated controller is properly positioned during learning so that CPU 13 can recognize the infrared signals received from the dedicated controller.

When controller 10 is first powered by, for example, inserting batteries therein, there are no I/R commands stored in RAM 25 and clock 27 has not been set. The user must set clock 27 to the proper time and day in order for clock 27 and the timers in CPU 13 to function properly.

The next step in the operation is to store I/R codes in the I/R code storage RAM 25. The first step in this operation is to operate SELECT keys 18A and 18B to cause the annunciator for the device to be learned to be illuminated. The next step in the operation is to set run/learn switch 40 to the learn position. The next step in the operation is to point the I/R transmitter of the source controller, in this case the controller for the TV, at an I/R receiver 120 of controller 10 and to depress the function key on the source controller for the function to be learned. Thus, if the first function on the TV controller to be learned is the on/off function, the user would press the on/off button of the TV controller while holding this controller with its I/R transmitter facing the I/R receiver of controller 10.

At this point, the user would release the button on the source controller. The user then presses the key in area 15 of controller 10 which is to control the particular function for the particular device. Assuming, for example, that the on/off button of the TV controller is to be learned, the user might press POWER button 44 on controller 10 at this time. When the button on controller 10 is depressed, display 12 will show the message BEGIN. Now the user presses the on/off button on the TV controller to input the I/R code to controller 10. The key should remain depressed until display 12 on controller 10 shows the message STORED. At this time, the key may be released in a normal manner. This sequence of operations may be repeated for each of the keys of the source controller until the codes for all of those keys have been stored. When all of the codes for a given controller have been stored, the run/learn switch 40 is returned to the run position. Since the received I/R codes have a certain amount of redundancy, CPU 13 compacts these codes before storing them in RAM 25. When one of the codes stored in RAM 25 is to be utilized, CPU 13 decompacts the stored information to obtain the original I/R code. When all of the codes for a given device have been stored, the process described above may be repeated for the I/R controller of the second device.

Once controller 10 has been programmed, it may be utilized to control any one of the devices which it has been programmed to control or may, by use of a program key, be utilized to simultaneously control two or more of the devices. To use the controller, run/learn switch 40 is set to the run position.

The first step in using the controller to control a particular device is to operate SELECT keys 18A and/or 18B to illuminate the annunciator corresponding to the selected device. Controller 10 is then held with the I/R transmitter 138 pointed in the general direction of the device to be controlled and the key which has been programmed for the desired function on the desired device is operated. This causes the name of the key or function to appear on display 12 and causes the I/R code for the function to be output. When the first function for the device, such as turning it on, has been completed, a key may be depressed to cause a second function to be performed. For example, one or more of the numbered keys may be depressed to select a channel, or CHANNEL CONTROL keys 20A and/or 20B may be operated to perform this function.

If at any time a key is operated for which an I/R code has not been stored in RAM 25 for the selected device, there will be no I/R output from the device and an ERROR message appears on display 12 for a predetermined time duration, for example, three seconds. At the end of this time period, display 12 returns to the standard time and day display. If the cancel key is pressed during the three-second interval, the ERROR message is cancelled and the standard time and day message appears. Further description of a reconfigurable remote control transmitter is found in U.S. Pat. No. 4,825,200 issued Apr. 25, 1989 to Evans, et al., incorporated herein by reference.

Figure 3:
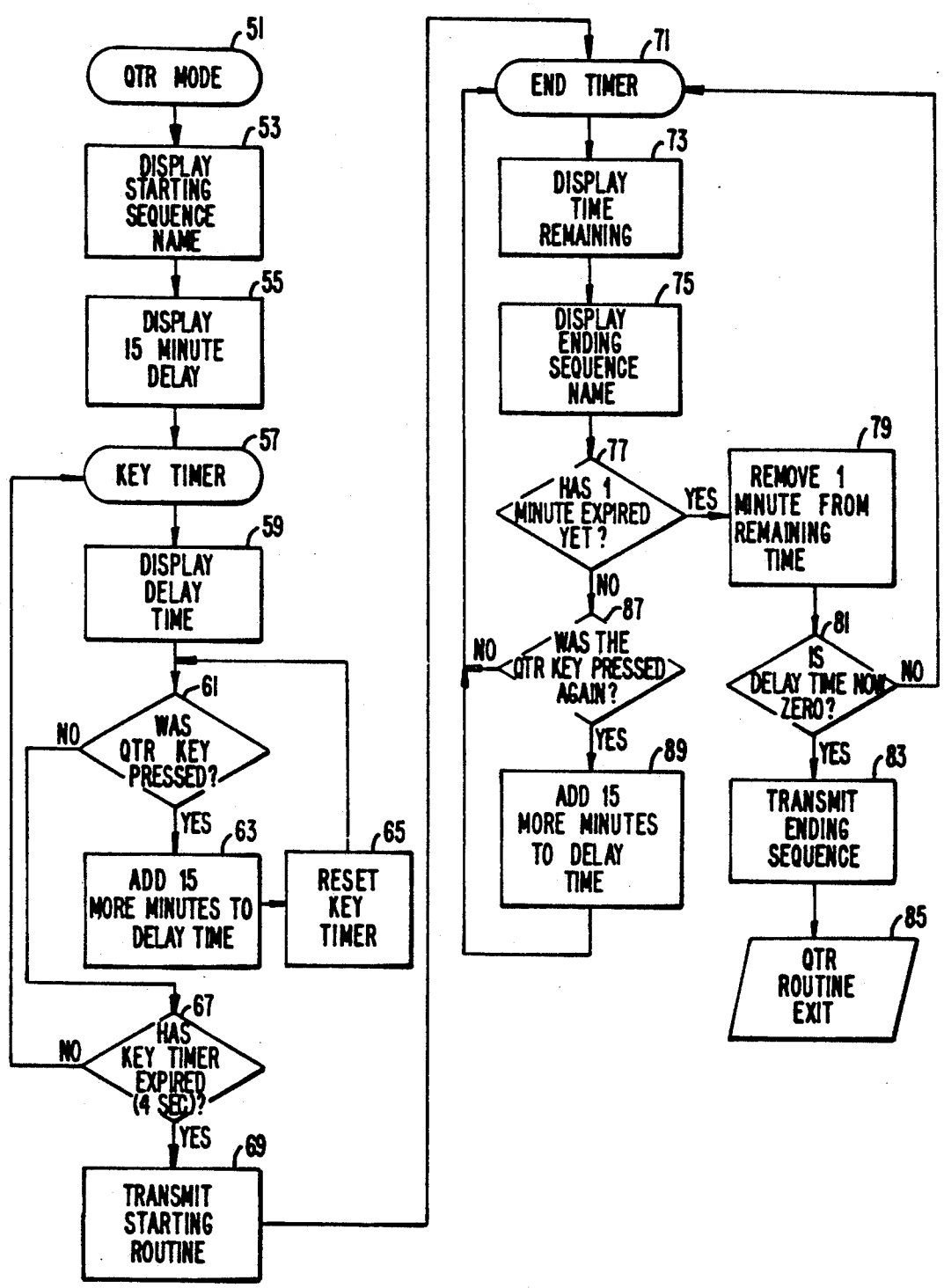
FIG. 3 is a flow chart showing the timing procedure for carrying out instructions in the universal remote control executing a sequence of instructions at a desired time.

FIG. 3 is a flow chart showing the sequence of events which take place as remote controller 11 causes a sequence of instructions to be executed at a desired time. Initially, the user causes remote control 11 to enter a quick touch function (QTF) mode 51 by depressing QTF keys 92A, 92B. In this mode the name of a sequence which will perform various functions is displayed in step 53 on display 12. A fifteen-minute base display time is also displayed in step 55. This time represents a base time unit which can be arbitrarily set to a selected value. Once the base display time has been displayed, a key timer is set in step 57 by depressing wait/timer key 24. This timer will keep track of an interval during which it is determined whether or not a QTF key has been pressed. The delay time continues to be displayed 59 and if a QTF key is pressed again within the selected time interval as shown in step 61, then one base time unit (e.g., fifteen more minutes) is added to the delay time 63 and the key timer is reset in step 65. Through this loop, the selected duration for recording can be increased in fifteen minute intervals. If a QTF key was not pressed and the selected elapsed time has not expired as shown in step 67 then a return to key timer step 57 results. If the selected elapsed time has expired in step 67, then a transmit starting sequence is performed by central processing unit 13. This starting sequence performs various functions. For example, it may turn on the cable box and the television as well as adjust the satellite dish to a particular position. It also turns on the VCR and starts it recording. These functions are executed by central processing unit 13 which retrieves the instructions from ROM 23 and RAM 25 and transmits them through transmit circuit 31.

Remote controller 11 then enters an end timer loop which begins with end timer step 71. The time remaining is displayed in step 73 on display 12 as well as the name of the ending sequence (step 75). In step 77 it is determined from clock 27 whether a particular time unit has expired. If a time unit has expired, that unit (e.g., one minute) is removed from the remaining time 79 and central processing unit 13 determines whether the delay time is zero in step 81. If the delay time has not reached zero, remote controller 11 returns to end timer step 71. If it has reached zero, the ending sequence is transmitted in step 83 and remote controller 11 exits the QTF routine (step 85). Transmission of the ending sequence in step 83 causes a series of instructions to be executed. For example, if it is necessary to turn off a cable box and a TV as well as the VCR, each of these steps will be carried out by remote controller 11. Each of these steps can be programmed into RAM 25 through keyboard 21 during a learning mode.

If one minute has not expired in step 77 then it is determined whether or not a QTF key has been pressed again (step 87). If it has not, then remote controller 11 returns to end timer state, step 71. If it has then a unit of time is added to the timer and remote controller 11 returns to end timer state step 71.

An assembly language code listing of the subroutines used in conjunction with the quick touch function in a remote controller is set forth below.

In general, to those skilled in the art to which this invention relates, many changes in construction and widely differing embodiments in applications of the present invention will suggest themselves without departing from its spirit and scope. For instance, the timer units for key timer time out and the base display time can be altered. Further, the keys on the remote controller could be configured in a variety of layouts. For example, the select key 18A, 18B, the channel keys 20A, 20B and the volume keys 22A, 22B, could be single keys instead of two separate keys. In addition, more keys may be situated under cover 105 of the controller of FIG. 1B. Thus, the disclosures and descriptions herein are purely illustrative and are not intended to be in any sense limiting. The scope of the invention is set forth in the appended claims.

| | | | | | |
|---|---|---|---|---|---|
| 28E2 | | 00076 | QTRKEY: | | do quick touch |
| key (transmit mode) | | | | | |
| 28E2 | 04793F | 00077 | brset | 2,return,qtrke3 | bypass set up |
| if already in QTR mode | | | | | |
| | | 00078 | | | |

-continued

| | | | | | | |
|---|---|---|---|---|---|---|
| 28E5 | CD294D | 00079 | jsr | e,gtqtrE | get ending sequence data | |
| 28E8 | 2454 | 00080 | bcc | qtrerr | do error if does not exist | |
| | | 00081 | | | | |
| 28EA | CD2949 | 00082 | jsr | e,gtqtrS | get starting qtr data | |
| 28ED | 244F | 00083 | bcc | qtrerr | do error if it does not exist | |
| | | 00084 | | | | |
| 28EF | 3F92 | 00085 | clr | d,dsp30 | clear all of these annun | |
| 28F1 | A648B791 | 0086 | mov | annimg+1,01001000b | install only these annun | |
| 28F5 | CD2E9A | 00087 | jsr | e,dspfav | show above and turn on FAV, if enabled | |
| | | 00088 | | | | |
| 28F8 | A60F | 00089 | lda | i,15 | default is 15 minutes | |
| 28FA | 3F7D | 00090 | clr | d,schdly | reset the hours | |
| 28FC | B77E | 00091 | sta | d,schdly+1 | init the minutes decade | |
| 28FE | CD269A | 00092 | jsr | e,tim2go | display the delay | |
| | | 00093 | | | | |
| 2901 | | 00094 | qtrke1: | | come here if have key input | |
| 2901 | CD3F19 | 00095 | jsr | e,clrslp | zero the sleep counters | |
| | | 00096 | | | | |
| 2904 | | 00097 | qtrke2: | | top of key scan loop | |
| 2904 | CD387D | 00098 | jsr | e,dlyfr3 | get keyboard data | |
| 2907 | 4D | 00099 | tsta | | see if have key | |
| 2908 | 261A | 00100 | bne | qtrke3 | go if have key | |
| | | 00101 | | | | |
| | | 00102 | had cancel or time out. check status for what to do | | | |
| 290A | A326 | 00103 | cpx | i,cankey | see if had cancel key | |
| 290C | 2733 | 00104 | beq | qtrcan | go if so | |
| | | 00105 | | | | |
| 290E | 05790C | 00106 | brclr | 2,retrun, qtrtxS | output starting sequence if flag not set | |
| 2911 | B67E | 00107 | lda | d,schdly+1 | get lsd | |
| 2913 | BA7D | 00108 | ora | d,schdly | get msd of time | |
| 2915 | 2703 | 00109 | beq | qtrexu | if delay is 0, output ending sequence not | |
| 2917 | CC20EF | 00110 | jmp | e,rthere | exit if this was qtr time add key | |
| | | 00111 | | | | |
| 291A | | 00112 | qtrexu: | | output ending sequence now | |
| 291A | CC2671 | 00113 | jmp | 3,CHKEN2 | do it | |
| | | 00114 | | | | |
| 291D | | 00115 | qtrtxS: | | had time out. do starting sequence | |
| 291D | 1479 | 00116 | bset | 2,return | flag that QTR mode enabled | |
| 291F | 1874 | 00117 | bset | 4,flags | flag to ignore the first rtc tic | |
| 2921 | CC2AF9 | 00118 | jmp | e,outseq | and output starting sequence | |
| | | 00119 | | | | |
| 2924 | | 00120 | qtrke3: | | received key from keyboard | |
| 2924 | A331 | 00121 | cpx | i,qtrkey | see if this again | |
| 2926 | 26D9 | 00122 | bne | qtrke1 | ignore any others | |
| | | 00123 | | | | |
| | | 00124 | have qtr key. add 15 minutes to delay time | | | |
| 2928 | B67E | 00125 | lda | d,schdly+1 | get current delay | |
| 292A | AB0F | 00126 | add | i,15 | install it | |
| 292C | B77E | 00127 | sta | d,schdly+1 | put it back | |
| 292E | 2409 | 00128 | bcc | qtrke4 | display it if not | |

-continued

| | | | | | |
|---|---|---|---|---|---|
| 2930 | 3C7D | 00129 | inc | d,schdly | adjust msd also |
| 2932 | 037D04 | 00130 | brclr | 1,schdly,qtrke4 | max delay count−1ff=8 hrs, 31 minutes |
| 2935 | 3F7D | 00131 | clr | d,schdly | too large, zap it out |
| 2937 | 3F7E | 00132 | clr | d,schdly+1 | |
| | | 00133 | | | |
| 2939 | | 00134 | qtrke4: | | now display key delay |
| 2939 | CD269A | 00135 | jsr | e,tim2go | show qtr time |
| 293C | 20C3 | 00136 | bra | qtrke1 | and loop |
| | | 00137 | | | |
| 293E | | 00138 | qtrerr: | | display error message here |
| 293E | CC20DE | 00139 | jmp | e,txerr | show error message |
| | | 00140 | | | |
| 2941 | | 00141 | qtrcan: | | cancel qtr mode here |
| 2941 | | 00142 | qtrer1: | | common exit point |
| 2941 | CC2110 | 00143 | jmp | e,mainCA | do cancel key in main exit |
| | | 00144 | | | |
| 2944 | | 00145 | qtrret: | | return here when start sequence sent |
| 2944 | AD07 | 00146 | bsr | gtqtrE | load ending sequence data |
| 2946 | CC2664 | 00147 | jmp | e,QTRENT | and use common area |
| | | 00148 | | | |
| 2949 | | 00149 | gtqtrS: | | this routine will retrive and load starting QTR |
| 2949 | AD07 | 00150 | bsr | gtqtrs | get coding |
| 294B | 2002 | 00151 | bra | getQTR | and use common retrive |
| | | 00152 | | | |
| 294D | | 00153 | gtqtrE: | | this routine will retrive and load ending QTR |
| 294D | AD07 | 00154 | bsr | gtqtre | get coding |
| 294F | CC2B81 | 00155 | getQTR: | jmp  e,getqtr | retrive and exit |
| | | 00156 | | | |
| 2952 | | 00157 | gtqtrs: | | get starting QTR sequence data |
| 2952 | A620 | 00158 | lda | i,00100000b | create staring qtr code |
| 2954 | 2002 | 00159 | bra | gtqtr1 | and use common |
| | | 00160 | | | |
| 2956 | | 00161 | gtqtre: | | get ending QTR sequence data |
| 2956 | A628 | 00162 | lda | i,00101000b | create ending qtr code |
| | | 00163 | | | |
| 2958 | | 00164 | gtqtr1: | | common processing |
| 2958 | 5F | 00165 | clrx | | zero this |
| 2959 | 81 | 00166 | rts | | then exit |
| | | 00167 | | | |
| 295A | | 00168 | edqtr: | | create the QTR function here |
| 295A | 1691 | 00169 | bset | 3,annimg+1 | show QTR on annunicator |
| 295C | 1974 | 00170 | bclr | 4,flags | set up to ask for starting sequence key |
| | | 00171 | | | |
| 295E | | 00172 | edqtr1: | | top of editing loop |
| 295E | ADF2 | 00173 | bsr | gtqtrs | get start codes and find the sequence |
| 2960 | 097402 | 00174 | brclr | 4,flags, edqtr2 | bypass if this is starting pass |
| 2963 | ADF1 | 00175 | bsr | gtqtre | get qtr ending sequence data |
| | | 00176 | | | |
| 2965 | | 00177 | edqtr2: | | |
| 2965 | CD2BFF | 00178 | jsr | e,EDNAME | get and edit sequence |
| 2968 | 4D | 00179 | tsta | | see if had time out |
| 2969 | 271F | 00180 | beq | edqtr8 | exit if had |

-continued

| | | | | | |
|---|---|---|---|---|---|
| timeout | | 00181 | | | |
| | | 00182 | had store key for name | | |
| 296B | CD2CB0 | 00183 | jsr | e,edseqd | now edit the |
| sequence data | | | | | |
| 296E | 4D | 00184 | tsta | | |
| 296F | 2719 | 00185 | beq | edqtr8 | exit if had |
| timeout | | | | | |
| | | 00186 | | | |
| 2971 | | 00187 | edqtr5: | | now save the |
| data in sequence area | | | | | |
| 2971 | DC2BE3 | 00188 | jsr | e,bufseq | buffer the |
| sequence | | | | | |
| 2974 | ADDC | 00189 | bsr | gtqtrs | get starting |
| sequence code data | | | | | |
| 2976 | 097402 | 00190 | brclr | 4,flags,edqtr6 | go if this is |
| starting sequence | | | | | |
| 2979 | ADDB | 00191 | bsr | gtqtre | not starting, |
| get ending sequence code | | | | | |
| 297B | CD3140 | 00192 | edqtr6: | jsr  e,Rplace | |
| install the code, replace any present | | | | | |
| | | 00193 | | | |
| 297E | 087404 | 00194 | brset | 4,flags,edqtr7 | exit if just |
| stored ending sequence | | | | | |
| 2981 | 1874 | 00195 | bset | 4,flags | just finished |
| starting sequence, show end | | | | | |
| 2983 | 20D9 | 00196 | bra | edqtr1 | then loop |
| | | 00197 | | | |
| 2985 | | 00198 | edqtr7: | | end qtr |
| sequence editing | | | | | |
| 2985 | 1791 | 00199 | bclr | 3,annimg+1 | remove annun |
| 2987 | CC21D4 | 00200 | jmp | e,ctlrn | display stored |
| and exit | | | | | |
| | | 00201 | | | |
| 298A | | 00202 | edqtr8: | | non store |
| ending to qtr edit mode | | | | | |
| 298A | CC21E5 | 00203 | jmp | e,lrncan and exit | |
| | | 00204 | | | |
| 298D | | 00205 | pushdc: | | this routine |
| will save the device count | | | | | |
| 298D | B637B772 | 00206 | copy | devcnt,devsav | save this data |
| 2991 | 1E72 | 00207 | bset | 7,devsav | flag for |
| refresh | | | | | |
| 2993 | 81 | 00208 | rts | | then exit |

What is claimed is:

1. A method of controlling the operation of a remotely controllable device with a remote controller, said method comprising the steps of:
   (a) specifying a particular operating function and a subsequent operating function to be performed by a remotely controllable device by operating a key in a remote controller;
   (b) setting a timer in the remote controller in response to the operating state of the same key to specify the duration of the performance of the particular operating function;
   (c) transmitting at least one command from the remote controller to the remotely controllable device to cause the device to initiate execution of the particular operating function;
   (d) counting down the timer value during execution of the particular operating function by the remotely controllable device; and
   (e) transmitting at least one other command from the remote controller to the remotely controllable device when the timer value has been reduced to zero to cause the device to execute said subsequent operating function.

2. The method of claim 1 wherein said step (a) of specifying includes the step of displaying the name of the particular operating function on a display device in the remote controller.

3. The method of claim 1 wherein said step (b) of setting includes the steps of (i) initially setting a base time value into the timer, (ii) examining the operating state of the key, (iii)( adding an addition base time value to the value in the timer if the key is in a first operating state during the examining step, and (iv) repeating steps (ii) and (iii) until the key is in a second operating state so that the performance duration specified by the timer is a multiple of the base time value.

4. The method of claim 1 wherein said step (b) further includes the step of displaying the performance duration in a display device in the remote controller.

5. The method of claim 4 wherein said step of displaying is performed prior to said step (c) of transmitting.

6. The method of claim 1 further including the step of displaying the current timer value in a display device in the remote controller during execution of the particular operating function by the remotely controllable device.

7. The method of claim 1 further including the step (f) of adding additional time value to the timer during execution of the particular operating function by the remotely controllable device to extend the performance duration.

8. The method of claim 7 wherein said step (f) is performed by examining the operating state of the key and adding an additional base time value to the value in the timer if the key is in a first operating state during the examining step.

9. The method of claim 1 wherein said step (c) of transmitting includes the step of transmitting a plurality of commands from the remote controller to other remotely controllable devices to perform particular operating functions with said devices as part of a starting sequence of instructions.

10. The method of claim 1 wherein said step (e) of transmitting includes the step of transmitting a plurality of commands from the remote controller to other remotely controllable devices to perform particular operating functions with said devices as a part of an ending sequence of instructions.

11. The method of claim 1 wherein said remotely controllable device is a video recorder; and wherein said particular operating function is the record function.

12. The method of claim 11 wherein said subsequent operating function is the stop function.

13. In a remote controller for controlling the operation of a plurality of remotely controllable devices, the controller including a keyboard having a plurality of keys for inputting instructions from a user, a memory for storing instructions specifying operating functions to be performed by the remotely controllable devices, means for transmitting the instructions to the remotely controllable devices, and clock means for generating time signals defining base time units; the improvement comprising:

a timer;

means including one of said plurality of keys for specifying a particular operating function and a subsequent operating function to be performed by one of said plurality of remotely controllable devices;

means coupled to said timer and including said one of said plurality of keys for setting the performance duration of the particular operating function in said timer means;

start means coupled to said setting means and responsive to the operation of said one of said plurality of keys for enabling said transmitting means to transmit at least one of said instructions corresponding to said particular operating function from the remote controller to said one of said remotely controllable devices to cause that device to initiate execution of the particular operating function;

a timer control coupled to said clock means and said timer for ending said clock means to count down the value in said timer during execution of the particular operating function; and end means coupled to said timer for enabling said transmitting means to transmit at least one other instruction from the remote controller to said one of said remotely controllable devices when the timer value has been reduced to zero to cause that device to execute said subsequent operating function.

14. The invention of claim 13 wherein said means for specifying includes means for displaying the name of the particular operating function.

15. The invention of claim 13 wherein said setting means includes means for setting a base time value into said timer, means for repeatedly sampling the operating state of said one of said plurality of keys, means for adding an additional base time value to the value in said timer if said one of said plurality of keys is in a first operative state when sampled by said sampling means, and means for completing operation of said setting means when said one of said plurality of keys is in a second operating state when sampled by said sampling means.

16. The invention of claim 13 further including means coupled to said timer for displaying the time value stored therein.

17. The invention of claim 13 wherein said timer control means includes means coupled to said keyboard for adding additional time value to the timer during execution of the particular operating function in response to the operation of said one of said plurality of keys.

18. The invention of claim 13 wherein said start means includes means for enabling said transmitting means to transmit a plurality of said instructions from the remote controller to other ones of said remotely controllable devices to perform particular functions with said devices as a part of a starting sequence of instructions.

19. The invention of claim 13 wherein said end means includes means for enabling said transmitting means to transmit a plurality of said instructions from the remote controller to other ones of said remotely controllable devices to perform particular functions with said devices as part of an ending sequence of instructions.

20. The invention of claim 13 wherein said one of said remotely controllable devices is a video recorder; and wherein said particular operating function is the record function.

21. The invention of claim 20 wherein said subsequent operating function is the stop function.

* * * * *